E. S. RICE.
Plow Wheel.

No 75,054. Patented March 3, 1868.

Witnesses:

Inventor:
E. S. Rice
per Munn & Co
Attorneys

United States Patent Office.

E. S. RICE, OF PAW PAW, MICHIGAN.

Letters Patent No. 75,054, dated March 3, 1868.

---

IMPROVEMENT IN PLOUGH-WHEEL.

---

*The Schedule referred to in these Letters Patent and making part of the same.*

---

TO ALL WHOM IT MAY CONCERN:

Be it known that I, E. S. RICE, of Paw Paw, in the county of Van Buren, and State of Michigan, have invented a new and useful Improvement in Plough-Wheel; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to improve the construction of plough-wheels, so as to keep the dirt from working in and wearing or clogging the wheel; and it consists in the combination of a removable collar with the wheel, axle, and standard, said collar being attached to the standard and passing around a flange formed upon the hub or axle of the wheel, as hereinafter more fully described.

Figure 1:
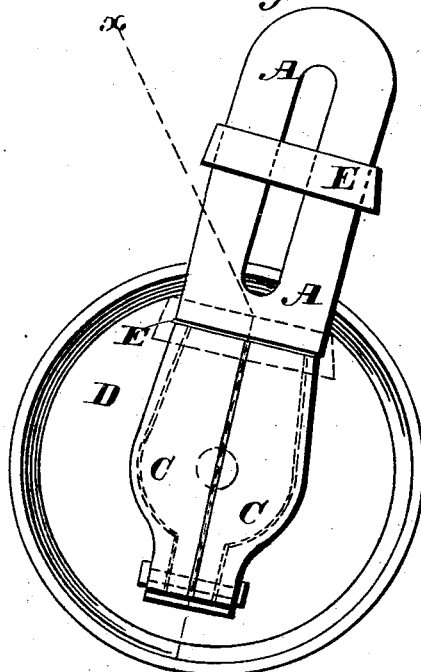
Figure 1 is a side view of my improved wheel.
Figure 2:
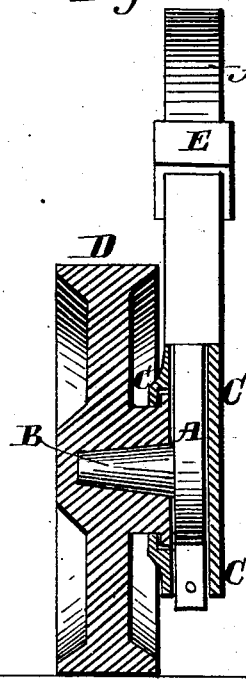
Figure 2 is a detail sectional view of the same, taken through the line $x\ x$, fig. 1.
Figure 3:
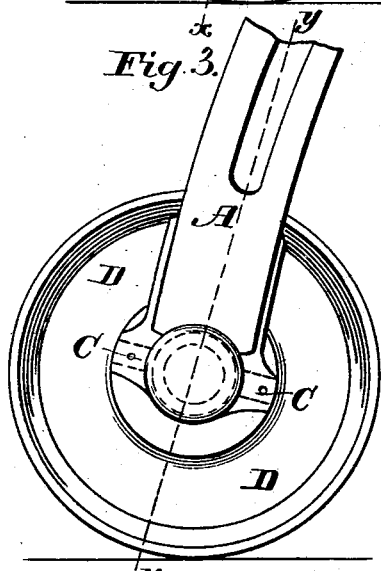
Figure 3 is a side view of a modified form of the same.
Figure 4:
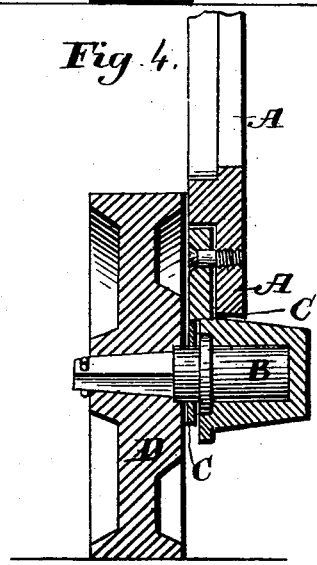
Figure 4 is a detail sectional view of the same, taken through the line $y\ y$, fig. 3.

A is the standard, which is adjustably attached to the plough in the ordinary manner. To the lower end of the standard A is attached the axle B, which enters and works in a socket formed in the hub of the wheel D, the outer end of said hub being closed, as shown in fig. 2. C is a collar, which is made in two parts, and fits around the lower end of the standard A, and around a flange formed upon the inner end of the hub of the wheel D, as shown in fig. 2. The lower ends of the collar C are secured in place by a bolt passing through the ends of the said collar, and through the end of the standard, as shown in figs. 1 and 2. The upper ends of the collar C may be secured to the standard A by means of a sliding cap or band, E, as shown in red in fig. 1. If desired, the axle B may be rigidly attached to the wheel D, and the socket be formed in the standard A. In this case the flange is formed upon the axle B, and the collar C is secured to the standard A by screws, as shown in figs. 3 and 4. This latter construction I prefer, as being simpler, equally effective in keeping the dirt from the working parts, and at the same time allowing the axle to be replaced when worn, without its being necessary to throw away the entire wheel and standard.

I claim as new, and desire to secure by Letters Patent—

The combination of a removable collar, C, with the wheel D, axle B, and standard A, said collar being removably attached to the said standard, and passing around a flange formed upon the hub or axle of the wheel, substantially as herein shown and described and for the purpose set forth.

E. S. RICE.

Witnesses:
A. H. HERRON,
E. A. THOMPSON.